US012533789B1

(12) United States Patent
Kao

(10) Patent No.: US 12,533,789 B1
(45) Date of Patent: Jan. 27, 2026

(54) TOOL STORAGE DEVICE FOR LIMITING POSITION OF RATCHETING HAND TOOL

(71) Applicant: TEST RITE INTERNATIONAL CO., LTD., Taipei (TW)

(72) Inventor: Tung-Sheng Kao, Taipei (TW)

(73) Assignee: TEST RITE INTERNATIONAL CO., LTD., Taipei (TW)

(*) Notice: Subject to any disclaimer, the term of this patent is extended or adjusted under 35 U.S.C. 154(b) by 0 days.

(21) Appl. No.: 18/908,798

(22) Filed: Oct. 8, 2024

(51) Int. Cl.
*B25H 3/00* (2006.01)
*B25H 3/06* (2006.01)

(52) U.S. Cl.
CPC ............... *B25H 3/006* (2013.01); *B25H 3/06* (2013.01)

(58) Field of Classification Search
CPC . B25H 3/06; B25H 3/006; B25H 3/04; B65D 25/101; B65D 85/20; A47F 7/00
USPC .................................................. 206/376, 349
See application file for complete search history.

(56) References Cited

U.S. PATENT DOCUMENTS

| | | | | | |
|---|---|---|---|---|---|
| 5,785,174 | A * | 7/1998 | Chow | B65D 73/0064 | 206/349 |
| 6,409,015 | B1 * | 6/2002 | Hu | B65D 73/0064 | 206/349 |
| 6,464,840 | B1 * | 10/2002 | McCann | B25H 3/04 | 206/349 |
| 6,820,742 | B1 * | 11/2004 | Chen | B65D 43/164 | 206/378 |
| 6,857,527 | B2 * | 2/2005 | Hu | B25H 3/04 | 206/478 |
| 6,976,581 | B2 | 12/2005 | Chen | | |
| 7,210,663 | B2 * | 5/2007 | Wheeler | B65D 73/0064 | 206/349 |
| D587,107 | S * | 2/2009 | Hao | D9/415 | |
| 7,494,018 | B2 * | 2/2009 | Wu | B65D 73/0064 | 211/70.6 |
| 7,565,973 | B2 * | 7/2009 | Chang | B65D 73/0064 | 248/689 |
| 7,648,029 | B2 * | 1/2010 | Chen | A47F 5/0006 | 211/70.6 |
| D645,338 | S * | 9/2011 | Kapur | D9/415 | |
| 8,047,386 | B2 * | 11/2011 | Chen | A47F 7/00 | 211/70.6 |
| 8,251,343 | B2 * | 8/2012 | Zhang | B65D 73/0064 | 248/314 |

(Continued)

*Primary Examiner* — Ernesto A Grano
(74) *Attorney, Agent, or Firm* — CIPO IP Group

(57) ABSTRACT

A tool storage device for limiting the position of a ratcheting hand tool includes a main body, an inner locking member that can lie against the main body and has a simulated tool block, an exterior fixing member having a protruding rod that can be passed through the inner locking member and couple with the main body, and a position-limiting frame that can be positioned on the main body. A receiving space for receiving an end of the ratcheting hand tool is formed between the inner locking member and exterior fixing member. An operation space where the ratcheting hand tool's another end can be extended therethrough is formed in the position-limiting frame or between the position-limiting frame and main body. The tool storage device's neat structure allows a consumer to operate the ratcheting hand tool in person with the ratcheting hand tool's movement extent being effectively controlled.

11 Claims, 7 Drawing Sheets

(56) References Cited

U.S. PATENT DOCUMENTS

| | | | | |
|---|---|---|---|---|
| 8,281,925 | B2 * | 10/2012 | Chang | B25H 3/04<br>206/349 |
| 8,403,155 | B1 * | 3/2013 | Kao | B25H 3/04<br>211/70.6 |
| 8,408,388 | B1 * | 4/2013 | Chen | B65D 25/103<br>206/45.24 |
| D734,612 | S * | 7/2015 | Liu | D3/315 |
| 9,180,590 | B1 * | 11/2015 | Ou | B65D 71/00 |
| 9,511,917 | B2 * | 12/2016 | Ou | B25H 3/04 |
| 9,522,467 | B1 * | 12/2016 | Kao | A47F 7/0028 |
| 9,694,491 | B1 * | 7/2017 | Kao | B25H 3/003 |
| 10,040,189 | B2 * | 8/2018 | Kao | A47F 7/0028 |
| 10,130,194 | B1 * | 11/2018 | Lai | B25H 3/04 |
| 10,398,237 | B2 * | 9/2019 | Chen | A47F 5/0006 |
| 10,765,232 | B2 | 9/2020 | Lai | |
| 2003/0183591 | A1 * | 10/2003 | Ling | A47F 7/00<br>211/70.6 |
| 2006/0086636 | A1 * | 4/2006 | Kuo | B65D 73/0064<br>206/349 |
| 2007/0007156 | A1 * | 1/2007 | Wu | B65D 73/0064<br>206/349 |
| 2007/0163915 | A1 * | 7/2007 | Wu | B65D 73/0014<br>206/495 |
| 2008/0029420 | A1 * | 2/2008 | Tong | A47F 7/024<br>206/349 |
| 2012/0091074 | A1 * | 4/2012 | Chang | B65D 73/0014<br>211/4 |
| 2012/0138497 | A1 * | 6/2012 | Lee | B25H 3/04<br>206/376 |
| 2017/0190047 | A1 * | 7/2017 | Kao | F16B 1/00 |

* cited by examiner

TOOL STORAGE DEVICE FOR LIMITING POSITION OF RATCHETING HAND TOOL

FIELD

The present disclosure relates to a tool storage device, and more particularly to a tool storage device where an inner locking member, an exterior fixing member and a position-limiting frame have the same assembling direction, and which allows a consumer's in-person operation thereon with the ratcheting hand tool's movement extent being limited.

BACKGROUND

A ratchet wrench is a common hand tool used mainly to tighten or loosen a threaded fastener (e.g., a bolt or screw). A typical ratchet wrench has a rotatable tool head portion, and the tool head portion is provided with a ratcheting mechanism that allows rotation in one direction alone. During use, therefore, the ratchet wrench produces a torque in only one direction in order to apply a force to a threaded fastener, and the ratchet wrench can be rotated freely in the opposite direction without producing any torque that acts on the threaded fastener.

In terms of external configuration, the tool head portion may be formed as a flat or cross-shaped head or have a hexagonal or other shape in order to adapt to threaded fasteners (e.g., bolts or screws) of different shapes. The ratcheting mechanism in the tool head portion generally includes a ratchet wheel and a pawl. When the ratchet wrench is rotated in a certain direction (e.g., clockwise), the pawl catches a tooth of the ratchet wheel and pushes the ratchet wheel into rotation, thereby producing a torque for tightening or loosening a threaded fastener. When the ratchet wrench is rotated in the opposite direction (e.g., counter-clockwise), the pawl slides over the tooth surfaces of the teeth of the ratchet wheel (i.e., without being engaged in the depression between any two adjacent teeth of the ratchet wheel) and therefore will not catch any tooth, which prevents the ratchet wheel from rotating in the opposite direction and hence from producing a torque acting on the threaded fastener.

A ratchet wrench of an improved design has a tool head portion formed as a hollow frame. This tool head portion has a hollow structure to be penetrated by a threaded fastener, and the inner periphery of the tool head portion (i.e., the inner periphery of the hollow frame) is generally provided with a ratcheting mechanism configured to work with the threaded fastener penetrating the tool head portion. When a user rotates the handle of such a ratchet wrench in a certain direction, the ratcheting mechanism produces a torque and thereby delivers the user's rotating force to the threaded fastener penetrating the tool head portion, producing a tightening or loosening effect on the threaded fastener. This ratchet wrench, therefore, can facilitate the operation of vehicle maintenance, machine maintenance, and other work that involves the operation of a bolt or screw that is located deep in a piece of equipment or is simply hard to reach. Moreover, the ratcheting mechanism is provided in the inner periphery of the tool head portion so as to be better protected from damage by dust, dirt, moisture, or collision due to an external force.

To effectively display a ratchet wrench and allow a potential buyer to know the functions and advantages of the ratchet wrench through actual operation, it is common practice for a vendor to provide the display device (e.g., a tool box) with a structure simulating a threaded fastener, so that a consumer can try the ratchet wrench before purchase. If, however, a plurality of simulated structures are to be provided, a complicated mechanism will be required, which not only adds to the difficulty of manufacture and assembly, but also lowers product yield. Accordingly, one of the issues to be addressed in the present disclosure is to provide an effective solution thereto.

SUMMARY

To provide a tool storage device that displays and receives a ratcheting hand tool and addresses the importance of having an easy-to-assemble structure, without diminishing the displaying and operating conveniences expected for such a device, as a result of repeated research and tests, the present disclosure provides a tool storage device for limiting a position of a ratcheting hand tool, so as to provide better use experience for vendors and/or consumers.

Certain aspects of the present disclosure are directed to a tool storage device for limiting a position of a ratcheting hand tool. The tool storage device includes a main body, an inner locking member, an exterior fixing member and a position-limiting frame. The main body is provided with a first positioning portion at a front side of the main body. The inner locking member has a rear side that can lie against the front side of the main body, and a front side that has a simulated tool block. The simulated tool block extends away from the main body and can: be extended into a through hole formed at one end of the ratcheting hand tool; and be engaged with a ratchet tooth portion of a ratcheting element in the through hole. The exterior fixing member is provided with a protruding rod at a rear side of the exterior fixing member. The protruding rod has a free end provided with a second positioning portion. The second positioning portion can be passed through a through hole of the inner locking member and couple with the first positioning portion. The rear side of the exterior fixing member and the front side of the inner locking member are spaced apart from each other with a distance to form a receiving space for receiving a first end of the ratcheting hand tool. The position-limiting frame can be positioned on the main body. An operation space for a second end of the ratcheting hand tool to be extended therethrough is formed in the position-limiting frame or between the position-limiting frame and the main body. The tool storage device can limit a segment of the ratcheting hand tool that extends into the operation space to be movable only in the operation space when the first end of the ratcheting hand tool is rotated about an axis defined by the simulated tool block. Accordingly, the tool storage device according to the present disclosure has a neat structure, is easy to assemble, and not only allows a consumer to operate the ratcheting hand tool in person, but also can effectively control the movement extent of the ratcheting hand tool.

In certain embodiments, the simulated tool block has at least one locking claw, a periphery of the protruding rod is formed with at least one fixing groove, and the at least one fixing groove allows the locking claw to be extended thereinto.

In certain embodiments, the at least one locking claw has a column portion and a claw portion. The claw portion is located at or adjacent to a free end of the column portion, extends toward a central axis of the simulated tool block, and can be extended into the at least one fixing groove.

In certain embodiments, the first positioning portion is an opening, the second positioning portion includes two positioning plates spaced apart from each other, a terminal end of each of the positioning plates has a hook portion that extends away from another hook portion, and the hook portion can be engaged with a surface portion of a rear side of the main body that is adjacent to the opening when the first positioning portion and the second positioning portion are coupled to each other and the positioning plates are inserted into the opening.

In certain embodiments, the main body is a plate.

In certain embodiments, the main body is a box and formed in the front side thereof with an accommodating space for accommodating an object.

In certain embodiments, the front side of the main body is provided with a platform having a sunken region having the first positioning portion.

In certain embodiments, the position-limiting frame is provided with at least one coupling portion, the main body is provided with at least one coupling portion that can be fixed with the at least one coupling portion of the position-limiting frame so that the main body and the position-limiting frame are combined to each other.

In certain embodiments, the at least one coupling portion of the position-limiting frame and the at least one coupling portion of the main body can be engagingly fixed to each other.

In certain embodiments, the main body is a plate, the at least one coupling portion of the main body includes two apertures, the at least one coupling portion of the position-limiting frame includes two hooking plates, each of two ends of the position-limiting frame is provided with one of the two hooking plates, and each of the two hooking plates can be moved past a corresponding left or right side of the main body in a rearward direction and be engaged with a corresponding one of the apertures from behind a rear side of the main body.

In certain embodiments, the main body is a box and formed in the front side thereof with an accommodating space for accommodating an object, the at least one coupling portion of the position-limiting frame includes an elastic plate and a shaft, the at least one coupling portion of the main body includes an aperture and at least one shaft hole, the elastic plate has an engaging block and can be extended into the accommodating space, the engaging block can be engaged in the aperture, and the shaft can be engaged in the at least one shaft hole.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
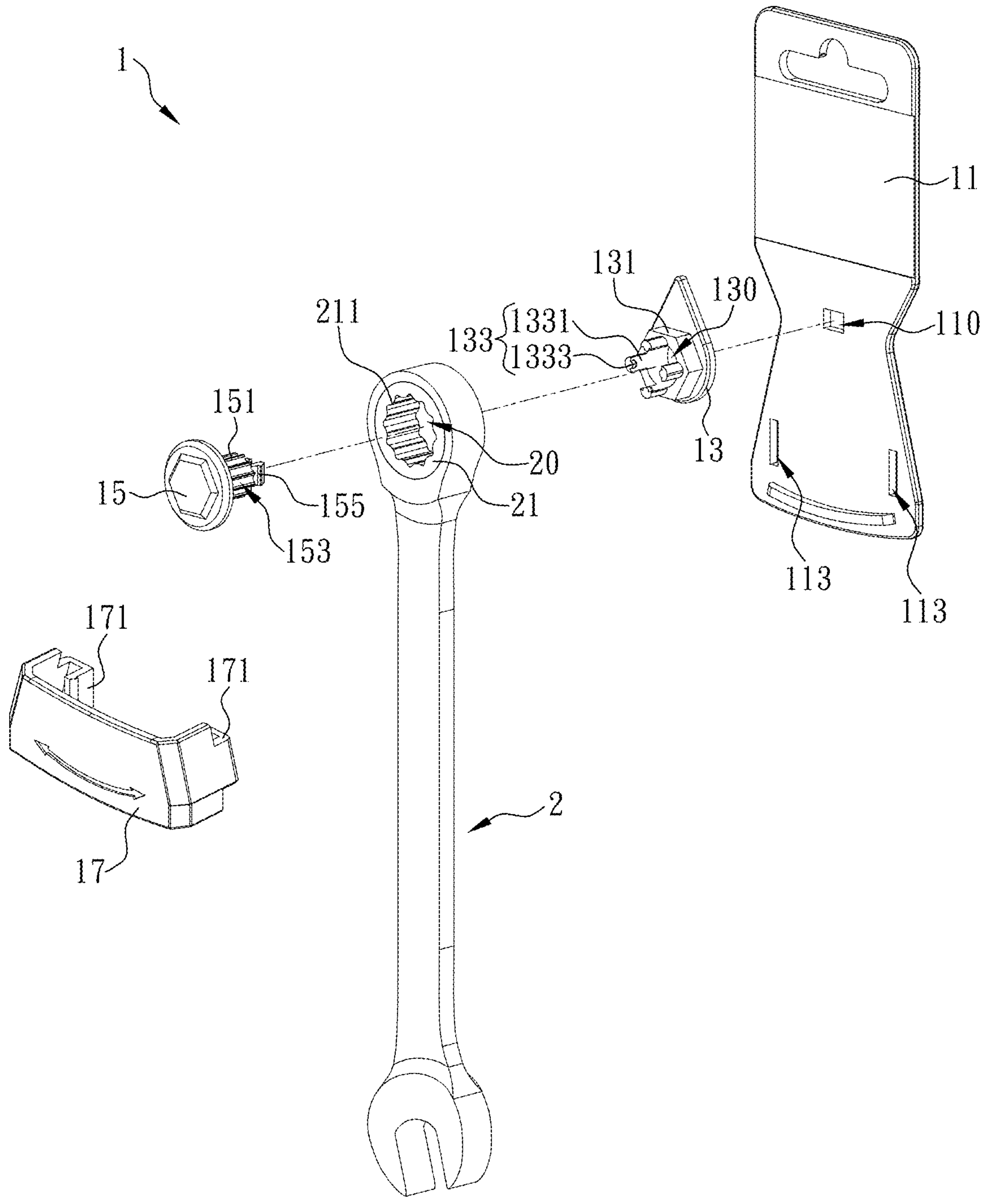
FIG. 1 is an exploded view of a tool storage device and a ratcheting hand tool according to certain embodiments in the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

As may be used herein, the term "substantially" refers to, for example, a value, or an average of values, in an acceptable deviation range of a particular value recognized or decided by a person of ordinary skill in the art, taking into account any specific quantity of errors related to the measurement of the value that may be resulted from limitations of a measurement system or device. For example, "substantially" may indicate that the value is within, for example, +5%, +3%, +1%, +0.5% or +0.1%, or one or more standard deviations, of the particular value.

Figure 2:
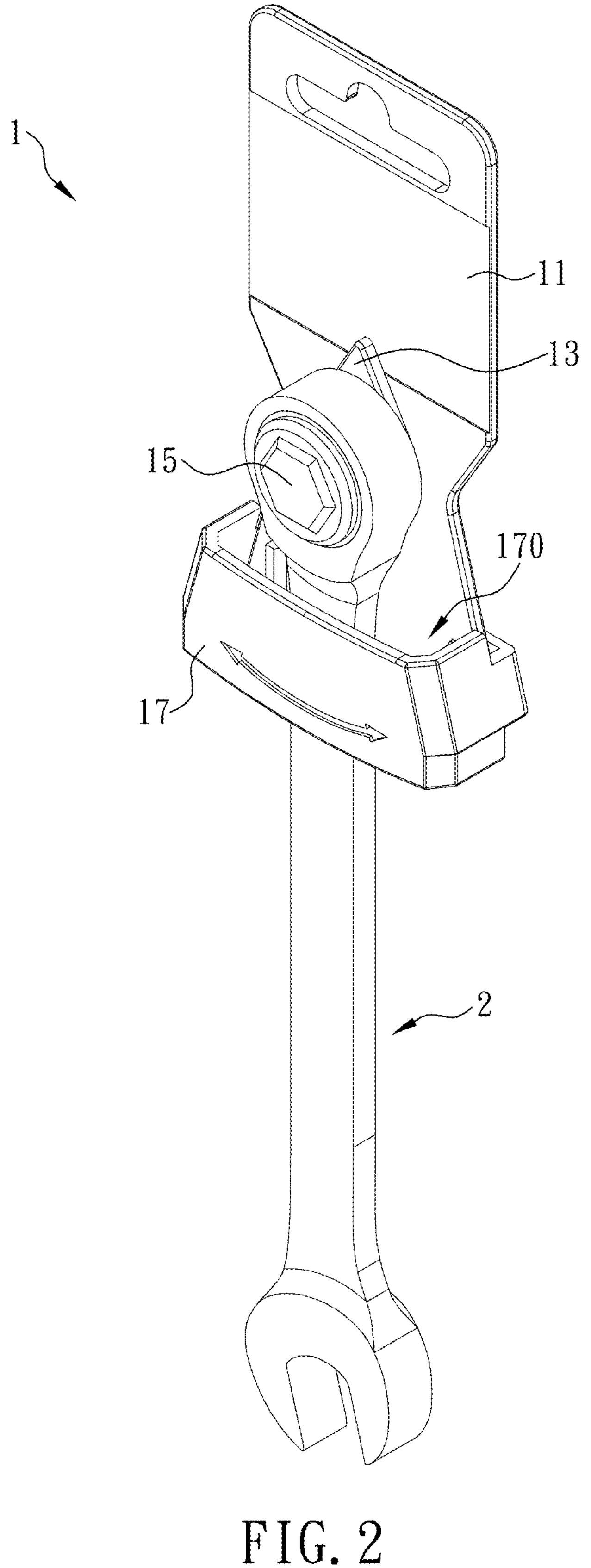
FIG. 2 is an assembled view of a tool storage device and a ratcheting hand tool according to certain embodiments in the present disclosure.

Certain aspects of the present disclosure are directed to a tool storage device for limiting the position of a ratcheting hand tool. To facilitate description of the relative positions of the various elements, the front side of each element is defined as facing the lower left corner of FIG. 1, the rear side as facing the upper right corner of FIG. 1, the left side as facing the upper left corner of FIG. 1, the right side as facing the lower right corner of FIG. 1, an upper side (e.g., the top side) as facing the top edge of FIG. 1, and a lower side (e.g., the bottom side) as facing the bottom edge of FIG. 1. In certain embodiments, the tool storage device 1 can be in the form similar to a hang tag and is so configured that a ratcheting hand tool 2 (e.g., a ratchet wrench) can be positioned in the tool storage device 1 and be operated by a user while being so positioned. Referring to FIG. 1 and FIG. 2, the tool storage device 1 includes a main body 11, an inner locking member 13, an exterior fixing member 15, and a position-limiting frame 17. The main body 11 is basically in the shape of a plate, and depending on practical needs, the surface of certain areas of the main body 11 can be formed with at least one deformed (e.g., raised or sunken) structure without changing the main planar configuration of the plate-shaped main body 11. The main body 11 is further provided with a first positioning portion 110. In certain embodiments, the first positioning portion 110 is configured as an opening, and the opening extends through the main body 11, is open on the front side and the rear side of the main body 11, and can be rectangular. However, the present disclosure is not limited thereto.

With continued reference to FIG. 1 and FIG. 2, the rear side of the inner locking member 13 is configured to lie against the front side of the main body 11, and the front side of the inner locking member 13 is provided with a simulated tool block 131. In certain embodiments, the simulated tool block 131 can be formed as a hexagonal frame to simulate the appearance of the hexagonal head of a hexagonal bolt. However, the present disclosure is not limited thereto. In certain embodiments, the simulated tool block 131 can have a circular shape or other shape to meet product requirements. The simulated tool block 131 extends away from the main body 11 (i.e., forward), and the front end of the simulated tool block 131 can further have four locking claws 133 that extend forward.

Figure 3:
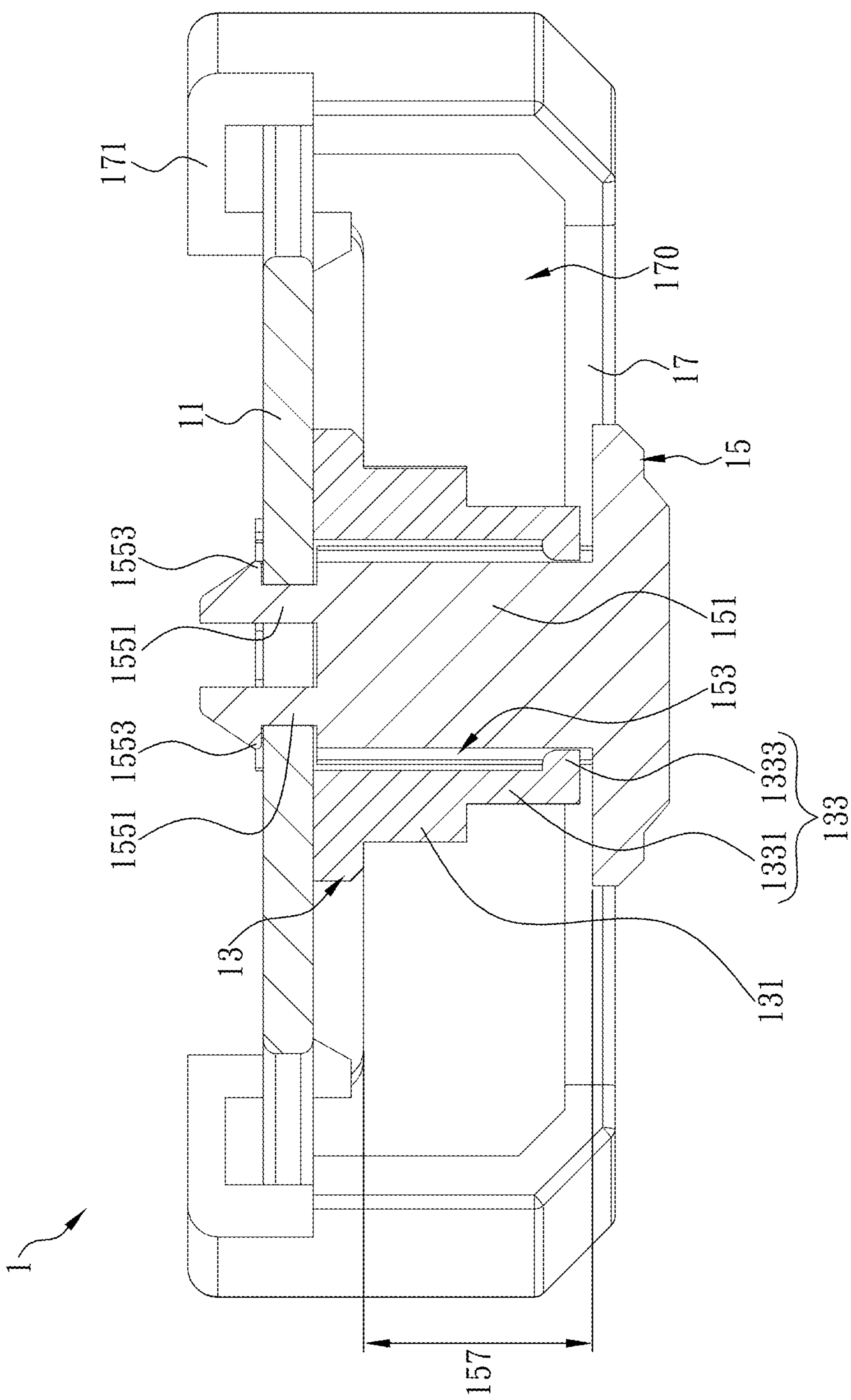
FIG. 3 is a cross-section view of a tool storage device according to certain embodiments in the present disclosure.

Referring to FIG. 1 and FIG. 3, each locking claw 133 includes a column portion 1331 and a claw portion 1333, wherein the claw portion 1333 is located at or adjacent to the free end (e.g., the front end) of the column portion 1331 and extends toward the central axis of the simulated tool block 131 (i.e., the axis extending through the center of the simulated tool block 131 along a front-rear direction). However, the present disclosure is not limited thereto, and in certain embodiments the inner locking member 13 can have one or more locking claws 133, and the shape of each locking claw 133 is not limited to that shown in the drawings and can be adjusted according to product requirements. The inner locking member 13 is further formed with a through hole 130 corresponding in position to the first positioning portion 110. In certain embodiments, the through hole 130 is located in the space surrounded by the hexagonal frame, and the through hole 130 extends through the inner locking member 13 and is open on the front side and the rear side of the inner locking member 13 so as to be in communication with the first positioning portion 110 (e.g., an opening).

Referring to FIG. 1 and FIG. 2, the rear side of the exterior fixing member 15 is provided with a protruding rod 151. The periphery of the protruding rod 151 can be formed with a plurality of fixing grooves 153. Depending on product requirements, the protruding rod 151 can have one or more fixing grooves 153 (e.g., one, eight, twelve, etc.). Each of the fixing grooves 153 is so configured that a corresponding locking claw 133 can be extended thereinto. In certain embodiments, the claw portion 1333 of a locking claw 133 can extend into a corresponding fixing groove 153. The free end (e.g., the rear end) of the protruding rod 151 is provided with a second positioning portion 155. The second positioning portion 155 is configured to be passed through the through hole 130 and couple with the first positioning portion 110 such that the exterior fixing member 15 is fixed to the main body 11, with the inner locking member 13 positioned between the exterior fixing member 15 and the main body 11.

Referring to FIG. 3, in certain embodiments, the second positioning portion 155 can include two positioning plates 1551. The positioning plates 1551 are spaced apart from each other, and the terminal end of each positioning plate 1551 has a hook portion 1553. The hook portions 1553 extend away from each other. When the positioning plates 1551 are inserted into the opening (i.e., the first positioning portion 110) of the main body 11, the positioning plates 1551 are compressed and deformed by the wall of the opening and thus brought closer to each other. Once the hook portions 1553 are moved past the opening, the positioning plates 1551 move away from each other due to their respective restoring forces such that the hook portions 1553 are engaged with a surface portion of the rear side of the main body 11 that is adjacent to the opening. As a result, the exterior fixing member 15, the inner locking member 13 and the main body 11 are fixed together. In certain embodiments, the second positioning portion 155 can instead be a screw, a rivet, a tightly fitting block, or another fixing element, and the structural configuration of the first positioning portion 110 can accordingly be adjusted to match that of the second positioning portion 155, so that the first positioning portion 110 and the second positioning portion 155 can be fixedly coupled to each other.

Figure 4:
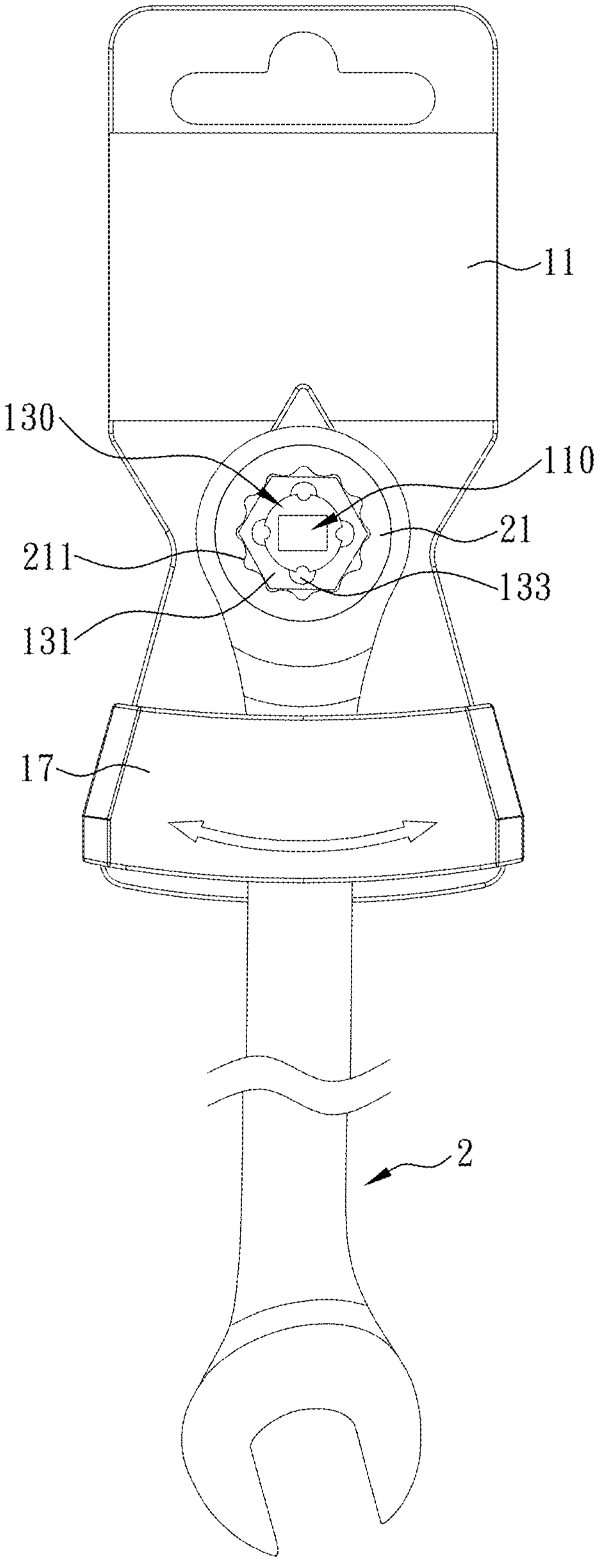
FIG. 4 is a front view of the tool storage device and the ratcheting hand tool in FIG. 1 without an exterior fixing member according to certain embodiments in the present disclosure.

Referring to FIG. 1 to FIG. 3, the rear side of the exterior fixing member 15 and the front side of the inner locking member 13 are spaced apart from each other with a distance to form a receiving space 157. The receiving space 157 can receive the ratcheting hand tool 2. One end (e.g., the top end, hereinafter referred to as the first end) of the ratcheting hand tool 2 can be formed with a through hole 20, and the through hole 20 is provided therein with a ratcheting element 21. For the sake of brevity, the basic structure and working principle of the ratcheting element 21 will not be detailed in the following paragraphs. The through hole 20 is configured to allow the simulated tool block 131 to be extended into the through hole 20, and the ratchet tooth portion 211 of the ratcheting element 21 can be engaged with the simulated tool block 131 (see FIG. 4), thereby allowing a consumer to rotate the ratcheting hand tool 2 and accordingly feel what it is like to operate the ratcheting hand tool 2 in person. When the rotating direction of the ratcheting hand tool 2 is a direction aiming to simulate tightening of a fastener, the ratcheting element 21 is engaged with the simulated tool block 131 and drives the simulated tool block 131 to rotate, thereby driving each locking claw 133 coupled with a corresponding fixing groove 153 to deform elastically, be disengaged from the corresponding fixing groove 153, move across the periphery of the protruding rod 151 between adjacent fixing grooves 153, and be engaged repeatedly with other fixing grooves 153. The repeated compression and deformation, and coupling with the fixing grooves 153, of the locking claws 133 produce the sensation of tightening felt by a consumer rotating the ratcheting hand tool 2. When the rotating direction of the ratcheting hand tool 2 is a direction where the ratcheting element 21 idles, that is, the rotation of ratcheting hand tool 2 does not drive the ratcheting element 21 to rotate, the ratcheting element 21 does not drive the simulated tool block 131 to rotate, and each locking claw 133 coupled with a corresponding fixing groove 153 neither deforms elastically nor is disengaged from the corresponding fixing groove 153. Accordingly, the simulated tool block 131 stays at its current position (i.e., will not be rotated by the ratcheting hand tool 2) while the consumer is rotating the ratcheting hand tool 2.

With continued reference to FIG. 1 to FIG. 3, the position-limiting frame 17 has a generally U-shaped configuration (as seen in a top view) and has two ends each provided with a first coupling portion 171. Each first coupling portion 171 is configured to be fixed to a matching second coupling portion 113 of the main body 11. In certain embodiments, each first coupling portion 171 is configured as a hooking plate and is generally L-shaped (as seen in a top view), and each second coupling portion 113 is configured as an aperture and is adjacent to one of the left and right sides of the main body 11. Each first coupling portion 171 is configured to be moved past the corresponding left or right side of the main body 11 in a rearward direction and then engaged with the corresponding second coupling portion 113 from behind the rear side of the main body 11 such that the position-limiting frame 17 is positioned on the main body 11, with the rear side of a middle region of the position-limiting frame 17 spaced apart from the front side of the main body 11 with a distance to form an operation space 170. However, in certain embodiments, the first coupling portions 171 and the second coupling portions 113 can also be structures designed for, for example, threaded connection, adhesive bonding, or welding, in order to meet actual product requirements. Also, the present disclosure is not limited to a configuration of the first coupling portions 171 being integrally formed with the position-limiting frame 17, and in certain embodiments the first coupling portions 171 can be independent elements (e.g., screws or nails).

With continued reference to FIG. 1 to FIG. 3, once the first end of the ratcheting hand tool 2 is positioned on the inner locking member 13 and located in the receiving space 157, the other end (hereinafter referred to as the second end) of the ratcheting hand tool 2 is extended through the operation space 170. When the first end of the ratcheting hand tool 2 is rotated about an axis defined by the simulated tool block 131, the ratcheting hand tool 2 is limited in position by the position-limiting frame 17, and the segment of the ratcheting hand tool 2 that extends into the operation space 170 is therefore movable only in the operation space 170, which in turn limits the movement extent of the rest of the ratcheting hand tool 2. The fact that the inner locking member 13, the ratcheting hand tool 2, and the exterior fixing member 15 are all mounted in the same direction (i.e., in the rearward direction) facilitates both manual production and automated production, and the position-limiting frame 17, which prevents the ratcheting hand tool 2 from swinging out of the extent of a space corresponding to the main body 11 during warehousing and transportation, allows subsequent handling and storage to be carried out with ease. Moreover, the tool storage device 1 allows the ratcheting hand tool 2 to be not only displayed, but also rotated by a consumer who has yet to buy the ratcheting hand tool 2, so that the consumer can feel what it is like to operate the ratcheting hand tool 2 in person. The tool storage device 1 can also prevent the ratcheting hand tool 2 from excessive rotation by a consumer.

Figure 5:
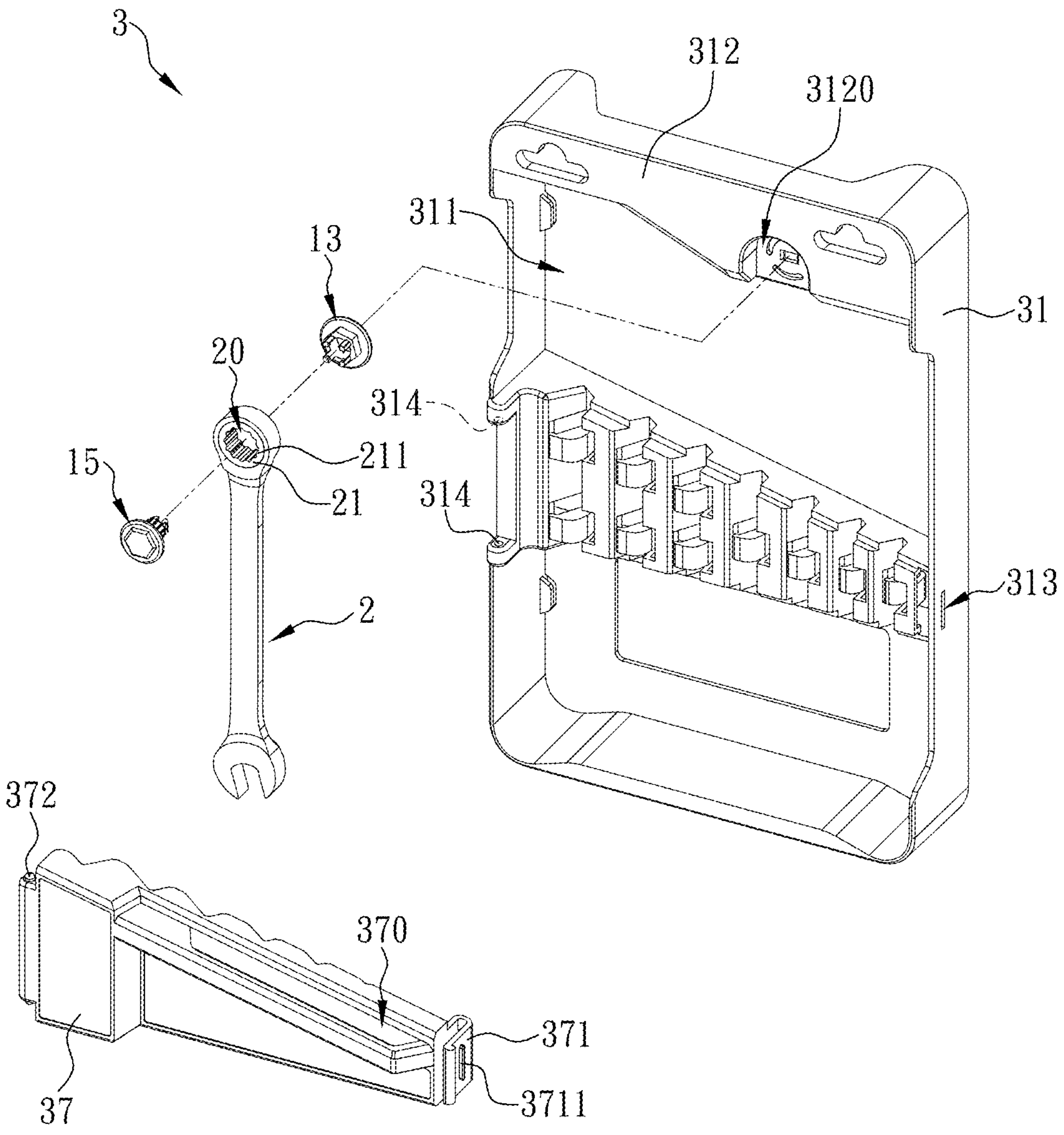
FIG. 5 is an exploded view of a tool storage device and a ratcheting hand tool according to certain embodiments in the present disclosure.
Figure 6:
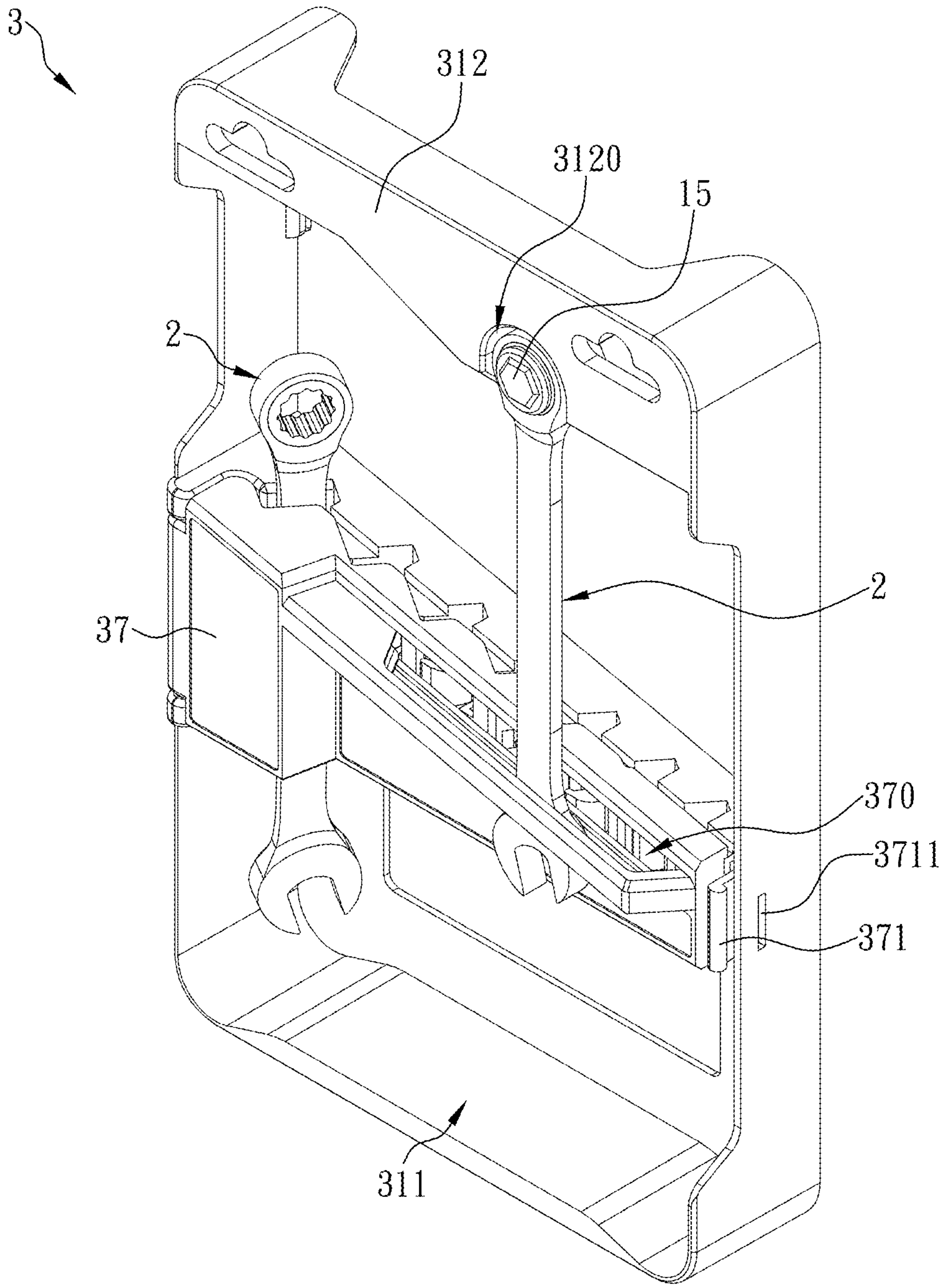
FIG. 6 is an assembled view of a tool storage device and a ratcheting hand tool according to certain embodiments in the present disclosure.
Figure 7:
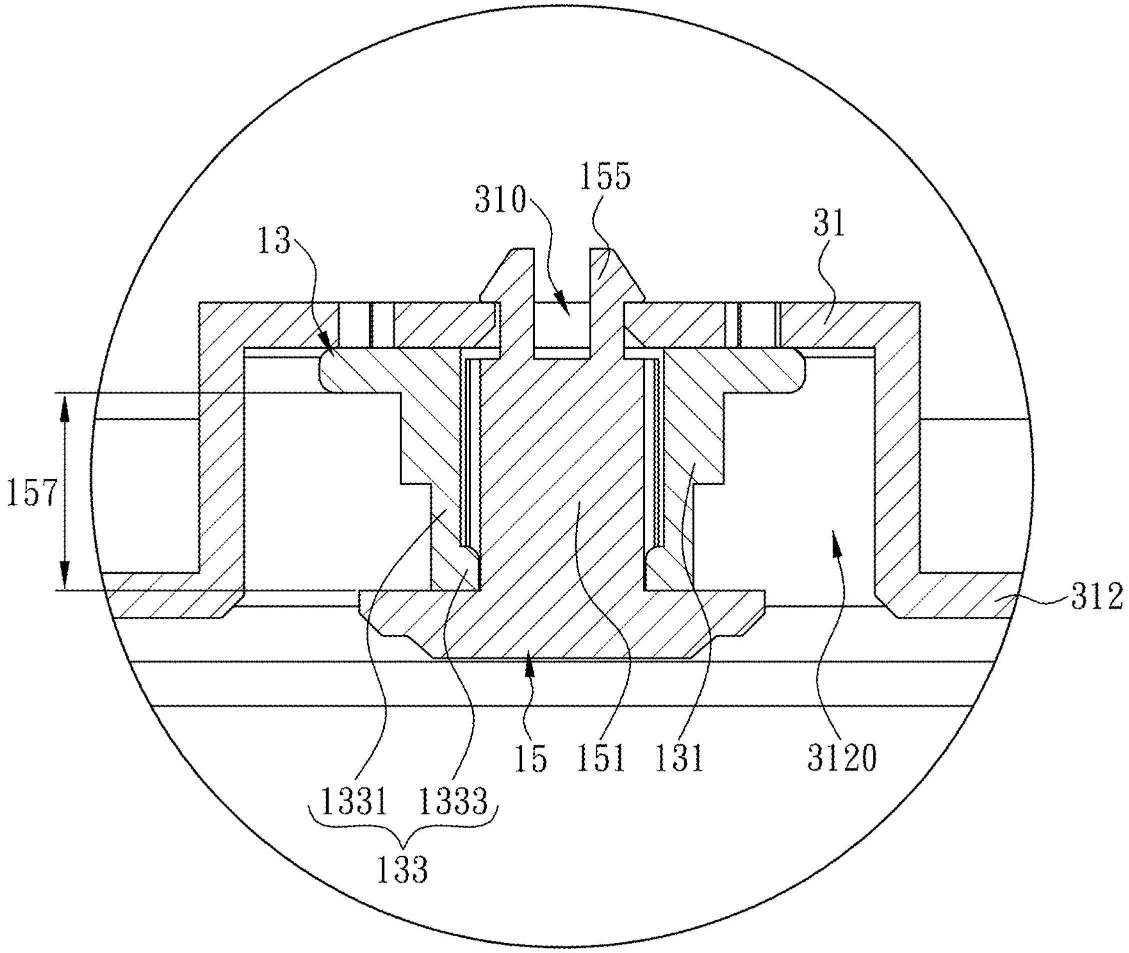
FIG. 7 is a cross-section view of a tool storage device according to certain embodiments in the present disclosure.

Referring to FIG. 5 to FIG. 7, in certain embodiments, a tool storage device 3 can be in the form of a tool box where at least one ratcheting hand tool 2 (e.g., ratchet wrench) can be positioned. For the sake of brevity, the following description is directed mainly to elements that are different from the elements in the embodiments described supra. The main body 31 of a tool storage device 3 is basically in the shape of a box and is concavely formed in the front side thereof with an accommodating space 311 for accommodating an object (such as but not limited to a ratcheting hand tool 2). As shown in FIG. 7, the protruding rod 151 of the exterior fixing member 15 can be configured to extend into the inner locking member 13, and the second positioning portion 155 on the protruding rod 151 can be configured to couple with a positioning portion 310 of the main body 31 so as to fix the exterior fixing member 15 and the inner locking member 13 to the main body 31. In addition, a receiving space 157 for receiving an end of the ratcheting hand tool 2 can be provided between the exterior fixing member 15 and the inner locking member 13. In certain embodiments, the front side of the main body 31 is provided with a platform 312 adjacent to the accommodating space 311, and the platform 312 has a sunken region 3120. The sunken region 3120 is provided with the positioning portion 310. The inner locking member 13 and the exterior fixing member 15 can be placed in the sunken region 3120. In certain embodiments, when the inner locking member 13 and the exterior fixing member 15 are placed in the sunken region 3120, the front side of the exterior fixing member 15 is flush with, or substantially in the same plane as (i.e., without protruding too much from), the front-side surface of the platform 312, which facilitates the stacking and storage of a plurality of tool storage devices 3.

In certain embodiments, with continued reference to FIG. 5 to FIG. 7, the position-limiting frame 37 is provided with two first coupling portions including a coupling portion 371 at one end and a coupling portion 372 at the other end. The coupling portion 371 and the coupling portion 372 are of different types. The main body 31 is provided with two second coupling portions including a coupling portion 313 and a coupling portion 314 that are of different types. For example, the coupling portion 371 at the right end of the position-limiting frame 37 can be configured as an elastic plate and be generally U-shaped (as seen in a top view), and the corresponding coupling portion 313 of the main body 31 can be configured as an aperture. The coupling portion 371 of the position-limiting frame 37 can be configured to be extended into the accommodating space 311 of the box so that the elastic plate will be compressed and deformed by the inner wall of the box, and once an engaging block 3711 on the elastic plate corresponds to the coupling portion 313 of the main body 31, the engaging block 3711 can be engaged in the coupling portion 313 (for example, the aperture) of the main body 31. The coupling portion 372 can be at the left end of the position-limiting frame 37 and be configured as a shaft, and the corresponding coupling portion 314 of the main body 31 can be configured as shaft holes. The shaft is configured to be engaged in the shaft holes. Accordingly, the position-limiting frame 37 can be fixed on the main body 31 via the coupling portions 371 and 372 and the coupling portions 313 and 314. The position-limiting frame 37 can also be formed with an operation space 370, and the operation space 370 is so configured that the second end of the ratcheting hand tool 2 can extend through the operation space 370. The position-limiting frame 37 can be different from the position-limiting frame 17 in that the position-limiting frame 37 can have the operation space 370 in itself while the operation space 170 is formed after the position-limiting frame 17 is coupled to the main body 11 (see FIG. 1 and FIG. 2). The position-limiting frame 37 allows the segment of the ratcheting hand tool 2 that extends into the operation space 370 to be movable only in the operation space 170; that is to say, the ratcheting hand tool 2 cannot be rotated beyond the degree defined by the operation space 370.

According to the above, referring to FIG. 1 to FIG. 7, the tool storage devices 1 and 3 according to the present disclosure have neat structures and are easy to assemble. In certain embodiments, the main body 11 or 31, the inner locking member 13, the exterior fixing member 15, and the position-limiting frame 17 or 37 can be put together only by engagement between corresponding engaging structures, which makes it easier for a user to detach the components of the tool storage device one after another in order to remove the ratcheting hand tool 2. Besides, the tool storage devices 1 and 3 allow the ratcheting hand tool 2 to be displayed with ease, and while the ratcheting hand tool 2 is on display, a consumer can operate the ratcheting hand tool 2 in person, with the position-limiting frame 17 or 37 limiting the position of the ratcheting hand tool 2 and thereby confining the ratcheting hand tool 2 within a predetermined moving space, so as to achieve effects including:

(1) Generally, the position-limiting frames 17 and 37 are not large in size, which accentuates the fact that the ratcheting hand tool 2 can be used in a small space. By allowing a consumer to try the ratcheting hand tool 2 to know what it is like to operate the ratcheting hand tool 2 in a small space, the consumer can simulate scenarios where a threaded fastener (e.g., a nut) is required to be loosened or tightened rapidly in a small space.

(2) Limitations are imposed on the range of rotation of the ratcheting hand tool 2 so that the ratcheting hand tool 2 will not be moved out of the extent of the main body 11 or 31 as may otherwise occur if a consumer who is trying the ratcheting hand tool 2 rotates it excessively and does not turn it back to its original position. If the ratcheting hand tool 2 can be rotated without limitation and is rotated excessively without returning to its original position, a consumer may collide with the ratcheting hand tool 2 inadvertently while the ratcheting hand tool 2 is on display for sale, and the ratcheting hand tool 2 may fall to the ground and get damaged, if not causing injury, because of the collision.

(3) While the tool storage devices 1 and 3 are being transported or placed, the ratcheting hand tool 2 will be confined within the position-limiting frame 17 or 37, i.e., kept from moving out of the extent of the main body 11 or 31, even if shaken by an external force, which helps maintain the stability of the ratcheting hand tool 2 when it is being tried or in storage.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A tool storage device for limiting a position of a ratcheting hand tool, comprising:

a main body provided with a first positioning portion at a front side thereof;

an inner locking member having a rear side configured to lie against the front side of the main body, and a front side that has a simulated tool block extending away from the main body and configured to be extended into a through hole formed at one end of the ratcheting hand tool and be engaged with a ratchet tooth portion of a ratcheting element in the through hole;

an exterior fixing member provided with a protruding rod at a rear side thereof, wherein the protruding rod has a free end provided with a second positioning portion configured to be passed through a through hole of the inner locking member and couple with the first positioning portion, and the rear side of the exterior fixing member and the front side of the inner locking member are spaced apart from each other with a distance to form a receiving space for receiving a first end of the ratcheting hand tool; and a position-limiting frame configured to be positioned on the main body, wherein an operation space for a second end of the ratcheting hand tool to be extended therethrough is formed in the position-limiting frame or between the position-limiting frame and the main body, wherein the tool storage device is configured to limit a segment of the ratcheting hand tool that extends into the operation space to be movable only in the operation space when the first end of the ratcheting hand tool is rotated about an axis defined by the simulated tool block.

2. The tool storage device according to claim 1, wherein the simulated tool block has at least one locking claw, a periphery of the protruding rod is formed with at least one fixing groove, and the at least one fixing groove is configured to allow the locking claw to be extended thereinto.

3. The tool storage device according to claim 2, wherein the at least one locking claw has a column portion and a claw portion located at or adjacent to a free end of the column portion, extending toward a central axis of the simulated tool block, and configured to be extended into the at least one fixing groove.

4. The tool storage device according to claim 1, wherein the first positioning portion is an opening, the second positioning portion includes two positioning plates spaced apart from each other, a terminal end of each of the positioning plates has a hook portion that extends away from another hook portion, and the hook portion is configured to be engaged with a surface portion of a rear side of the main body that is adjacent to the opening when the first positioning portion and the second positioning portion are coupled to each other and the positioning plates are inserted into the opening.

5. The tool storage device according to claim 1, wherein the main body is a plate.

6. The tool storage device according to claim 1, wherein the main body is a box and formed in the front side thereof with an accommodating space for accommodating an object.

7. The tool storage device according to claim 6, wherein the front side of the main body is provided with a platform having a sunken region having the first positioning portion.

8. The tool storage device according to claim 1, wherein the position-limiting frame is provided with at least one first coupling portion, the main body is provided with at least one second coupling portion configured to be fixed with the at least one first coupling portion so that the main body and the position-limiting frame are combined to each other.

9. The tool storage device according to claim 8, wherein the at least one first coupling portion and the at least one second coupling portion are configured to be engagingly fixed to each other.

10. The tool storage device according to claim 9, wherein the main body is a plate, the at least one first coupling portion includes two hooking plates, the at least one second coupling portion includes two apertures, each of two ends of the position-limiting frame is provided with one of the two hooking plates, and each of the two hooking plates is configured to be moved past a corresponding left or right side of the main body in a rearward direction and engaged with a corresponding one of the apertures from behind a rear side of the main body.

11. The tool storage device according to claim 9, wherein the main body is a box and formed in the front side thereof with an accommodating space for accommodating an object, the at least one first coupling portion includes an elastic plate and a shaft, the at least one second coupling portion includes an aperture and at least one shaft hole, the elastic plate has an engaging block and is configured to be extended into the accommodating space, the engaging block is configured to be engaged in the aperture, and the shaft is configured to be engaged in the at least one shaft hole.

* * * * *